Sept. 29, 1931.  G. C. OXER  1,825,280
METHOD FOR LOCATING POINTS OF LEAKAGE IN CONDUITS
Filed Aug. 22, 1929
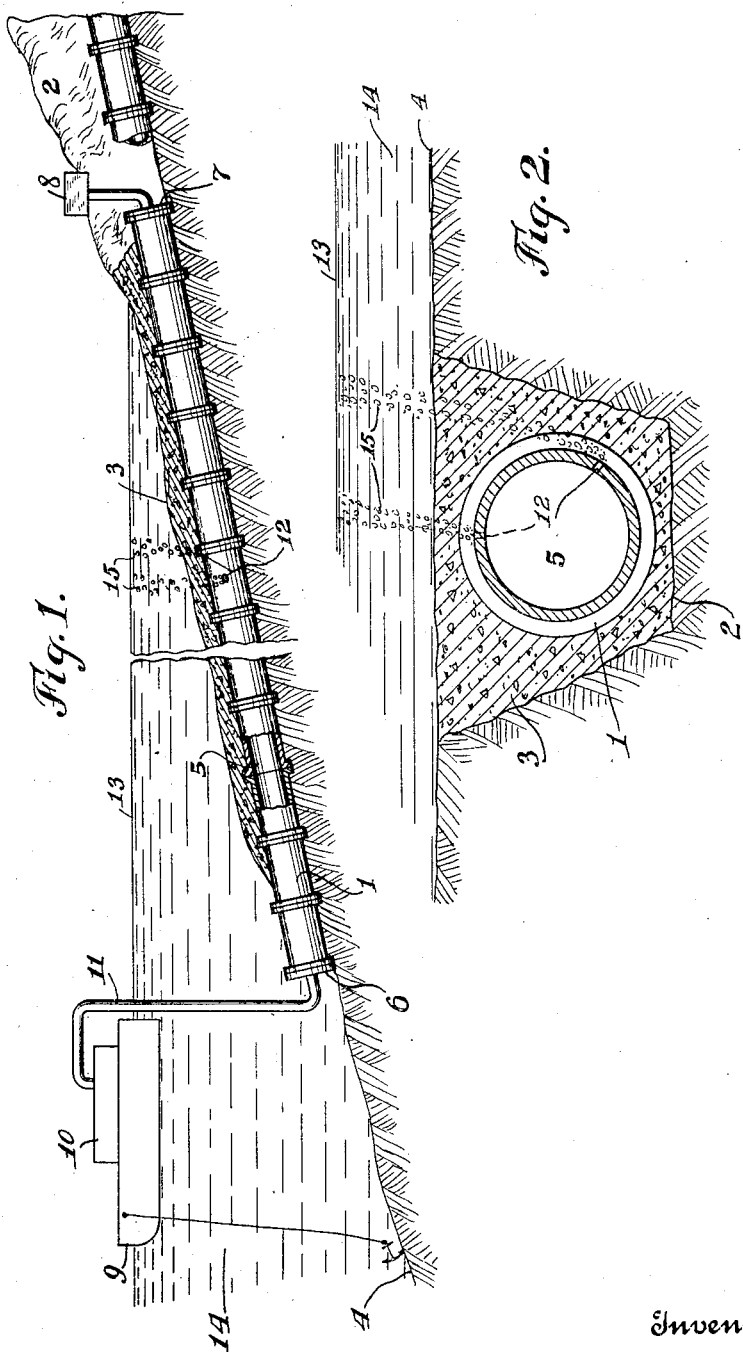
Inventor
George C. Oxer
By Attorney Patented Sept. 29, 1931

1,825,280

UNITED STATES PATENT OFFICE

GEORGE C. OXER, OF NEW YORK, N. Y.

METHOD FOR LOCATING POINTS OF LEAKAGE IN CONDUITS

Application filed August 22, 1929. Serial No. 387,649.

This invention relates to a method for testing for leakage, in a submerged or submarine conduit, and more particularly to a method whereby a visual indication will be given on the surface of the water as to the location of defective points where leakage occurs, in a conduit submerged, or laid on or in the bed of a body of water.

In submarine conduits, such as water lines, oil lines, sewer outfalls, and in general any conduit submerged in water, or water and mud, and carrying a fluid within, it is desirable, and in most cases required that the conduit be sufficiently tight to prevent the escape of the internal liquid, or the entrance of the external liquid into the conduit, through defects in the joints or walls of the conduit.

Specifications covering the construction of submarine conduits usually require that no more than a stated amount of leakage, or loss of internal liquid will be permitted at a stated internal pressure. To determine leakage certain pressure tests are applied to the submarine conduit for a given length of time. If it is found that the conduit as laid does not meet the requirements of the specification as to leakage, it is necessary to locate the points at which the leakage occurs and to repair these points until it does meet the specification.

One known method for testing consists in applying a hydrostatic test to the conduit at a specified pressure, for a specified length of time. This test will indicate the existence of leaks if there are any, but will not give an indication as to their location. In order to determine the location of the leaks by this method, it is necessary to employ a diver to proceed along the conduit and discover the point or points by the sense of feeling, that is, he depends upon finding and feeling the issuing jet of liquid coming through the aperture in the conduit joint or wall. Sometimes the internal liquid used in testing is colored by means of a dye. In deep water, or where the conduit is laid in a trench and covered with solid material, it is practically impossible for the diver inspector to locate the points at which leakage is taking place.

There have been attempts to test conduits of this kind by means of air pressure, but economic design usually dictates a weight of conduit which is not heavy enough to resist the uplift or buoyant forces if the conduit is dewatered, and consequently, when filled with air the conduit rises to the surface, or is displaced from its foundation, breaks in sections and falls back to the bottom, a wreck.

The object of this invention is to provide a method for testing such conduits, whereby a visual indication will be made at the vicinity of the leak, and on the surface of the water substantially above the point where the leak occurs, thus saving much valuable time in locating the point or points where leakage occurs.

A further object is to provide an economical means for testing such conduits under pressure, which will not disturb the conduit but at the same time will give positive indications as to the location of the leaks, if any exist.

According to a preferred embodiment of my method, a gas impregnated or charged liquid at the required test pressure is introduced into the conduit, this pressure being maintained by the injection of additional liquid or fluid if leaks develop. If there are leaks in the conduit, the charged liquid will flow out of the apertures in the joints or walls of the conduit which constitute the leaks, with a velocity depending upon the relative internal and external pressures. As the charged liquid escapes into the medium surrounding the conduit, the pressure on the charged liquid is greatly reduced, and the issuing jet agitated by its contact with the surrounding medium, thus releasing the gas in the charged liquid, which gas rises to the surface of the water in the form of bubbles. This stream of bubbles rising to the surface will form a visible indication of the presence and location of a leak or leaks in the conduit, and also may be made to serve as a measure of the size of the leak by gathering the escaping gas in a suitable receptacle, over a specified period of time. Knowing the degree of saturation and internal pressure, the amount of liquid escaping in the specified time can be computed from the volume of gas collected. Knowing the amount of liquid escaped and the pressure the approximate size of the orifice or leak can be computed or estimated.

One embodiment of my invention is shown by way of example in the accompanying drawings in which:

Fig. 1 shows a longitudinal section of a section of submarine conduit under test for leakage; and Fig. 2 shows a cross section on line 2—2 of Fig. 1.

Referring more particularly to the drawings 1 represents a section of submarine conduit, which in this particular embodiment might be part of a water line laid on a suitable foundation in a trench 2 cut in the floor or bottom 4 of body of water 14, and covered with backfill as at 3. Where it is required that conduit 1 be subjected to an internal hydrostatic pressure test in order to determine whether one or more leaks 12 exist, the section of conduit 1 is closed at either end as by suitable flanges 6 and 7. At one end as at flange 7 a suitable relief valve or group of valves indicated at 8 is connected to conduit 1 and at the other end as at flange 6, suitable piping 11 is connected to conduit 1. Piping 11 leads upward to and connects with a suitable liquid charging and pumping equipment 10, located on a suitable float or barge 9. This arrangement may be reversed if so desired, that is relief valves 8 connected to flange 6 and the charging and pumping equipment 10 connected to flange 7.

The conduit 1 being submerged, is already filled with water when closed by applying flange 6 and flange 7. The test pressure having been determined by specification, the relief valves 8 are set so that if the pressure in conduit 1 rises above a given value, liquid will be discharged from the interior 5 of conduit 1. The charging and pumping equipment 10 is now operated, forcing a gas impregnated or charged liquid into conduit 1, through piping 11. As the internal pressure rises above the setting of relief valves 8, the liquid originally in conduit 1 flows out, being followed by the charged liquid. The pressure is now brought to that required by the specification. If there are any leaks 12 in the conduit the pressure will tend to drop due to loss of charged liquid through said leaks 12. The required pressure is maintained by suitable operation of the charging and pumping equipment 10.

The problem now is to determine the exact location of any leaks 12, so that the necessary action may be taken to effectively repair said leak 12 in the shortest possible time.

The charged liquid in conduit 1 is under a pressure, which might be of the magnitude of 40 to 100 pounds per square inch, and when said charged liquid escapes through apertures constituting leaks 12, this pressure within the escaping liquid is greatly reduced, thus releasing the gas from the charged liquid, which gas rises in the form of bubbles 15, to the surface 13 of water body 14, thus giving a visible indication as to the exact point where leaks 12 occur.

Quick determination of the points at which leakage occurs under the specified pressure, is of considerable importance from an economic standpoint. If the pressure test is made on conduit 1 by means of uncharged water, the only way to discover the points of leakage is for a diver to proceed along the conduit 1, before backfill 3 has been placed, and determine by the sense of feeling where a jet is issuing from leak 12. After the backfill 3 has been placed this procedure is impossible and removal of a part of backfill 3 may be necessary, for oftimes the specification calls for a leakage test after the backfill has been placed. This is a very expensive phase of the leakage testing.

If the leakage test on conduit 1 is attempted by using compressed air or gas alone or in considerable quantities, conduit 1 will be displaced from its foundation and will rise to the surface or break up into sections in its effort to rise due to the buoyancy of its displacement.

Such a contingency might be overcome by placing weights on the conduit after it is in place, but its cost would be prohibitive, and the additional weight would very likely displace the conduit on its foundation causing additional leaks and possible breakage.

The desideratum is, after the conduit has been successfully placed in position to see that it will conform to the specifications as to leakage under stipulated internal pressure, and to do this with the least possible expenditure of time and money.

My invention does this, in that such leaks as may develop are at once indicated visually and without danger of displacing the conduit, even after the backfill 13 has been placed. The charging and pumping equipment 10 is commonly known and can be purchased from manufacturers or made at the site. The gas for impregnating or charging the liquid which is used to fill conduit 1, might be carbonic acid gas, which can be purchased in the open market in large quantities in liquid form at a very low cost. Carbonic acid gas in liquid form seems to be the most accessible and economic gas to charge the testing liquid in my invention, although others might be used.

Various other modifications than those described and suggested above for impregnating or charging a liquid with gas, and introducing the charged liquid under pressure into the conduit, may be made by those skilled in the art, without departing from the invention as defined in the following claims.

What I claim is:

1. The method of locating points of leakage in a submerged conduit which comprises introducing into the conduit a body of liquid impregnated with a gas under pressure, whereby as such liquid passes through the conduit, some of the impregnated liquid will escape through the points of leakage, and bubbles will form by the gas released from such escaping liquid, the bubbles indicating the point or points of leakage.

2. Method of detecting points or areas of leakage in a submerged conduit filled with a liquid which comprises introducing into the conduit a body of liquid impregnated with gas under pressure, causing such liquid to flow through the conduit, whereby a part thereof will be discharged at the point or areas of leakage permitting the gas therein to escape and provide a visual indication of the leakage points at the surface of the liquid within which the conduit is submerged.

3. Method of detecting points or areas of leakage in a submerged conduit filled with a liquid which comprises applying closure means to each end of the conduit, providing a relief valve in the closure means at one end of the conduit, applying a fluid pump connection to the closure at the other end of the conduit, and utilizing said pump to introduce into the conduit a body of liquid impregnated with a gas under pressure such that said body of liquid will be caused to pass through the conduit toward said relief valve, portions thereof escaping through any points of leakage whereby bubbles of the gas will be released at such points for giving a visual indication of the location of such points.

4. The method of locating any points of leakage in a submerged conduit which comprises introducing into the conduit a heavy fluid carrying carbon dioxide gas under a pressure sufficient to cause portions of such fluid to escape at the point or points of leakage whereby bubbles of the gas are formed giving a visual indication of the location of such points.

5. In combination, a conduit which is in part submerged, closure means at each end of said conduit, means in the neighborhood of one end of said conduit for relieving excess pressure within the conduit, means for supplying a quantity of liquid impregnated with a gas under pressure to the other end of said conduit, and for maintaining a substantial pressure in the conduit while such liquid is forced toward the relief means at the other end of the conduit.

6. The method of locating points of leakage in a submerged conduit which comprises passing through the conduit a quantity of liquid together with gas, whereby a portion of the same may escape at any point or points of leakage to provide gas bubbles outside the conduit for giving a visual indication of the point or points of leakage.

Signed at New York, in the county of New York and State of New York, this twenty-first day of August, A. D. 1929.

GEORGE C. OXER.